United States Patent [19]
Chan

[11] Patent Number: 5,878,655
[45] Date of Patent: *Mar. 9, 1999

[54] AUTOMATIC BAKING APPARATUS

[75] Inventor: Wing Kin Chan, Kowloon, Hong Kong

[73] Assignee: China Packific Trade Ltd., Virgin Islands (Br.)

[ * ] Notice: This patent issued on a continued prosecution application filed under 37 CFR 1.53(d), and is subject to the twenty year patent term provisions of 35 U.S.C. 154(a)(2).

[21] Appl. No.: 751,701

[22] Filed: Nov. 18, 1996

[51] Int. Cl.⁶ .............................. A47J 37/12; A23B 4/03
[52] U.S. Cl. ............................. 99/327; 99/348; 99/357; 99/476; 126/21 A
[58] Field of Search ................... 989/348, 357, 989/327, 476, 332, 331; 126/214

[56] References Cited

U.S. PATENT DOCUMENTS

| | | | |
|---|---|---|---|
| 4,903,587 | 2/1990 | Nagasaka et al. | 99/348 X |
| 5,528,979 | 6/1996 | Yoshida | 99/348 X |
| 5,531,153 | 7/1996 | Maruyama et al. | 99/348 X |
| 5,584,233 | 12/1996 | Glucksman et al. | 99/348 |
| 5,588,352 | 12/1996 | Harrison | 99/348 X |

*Primary Examiner*—Reginald L. Alexander
*Attorney, Agent, or Firm*—Burns, Doane, Swecker & Mathis, L.L.P.

[57] ABSTRACT

An automatic convection heating baking apparatus for bread or cake making with greatly improved automatic-baking quality is disclosed. Baking in this apparatus is achieved by two hot air streams each covering about half of the baking chamber space. Hot air circulation is produced by forming suction and blowing regions within the baking chamber by placing an electric fan within a single ventilation compartment. The machine is compact and low-cost since only a single electric fun is needed to cause circulation and to produce two hot air streams, premature hot air return to the ventilation compartment is prevented by using air-regulating means. Dual timer for mixing and baking is provided to improve cake fluffiness by controlling heating during ingredient mixing.

10 Claims, 7 Drawing Sheets

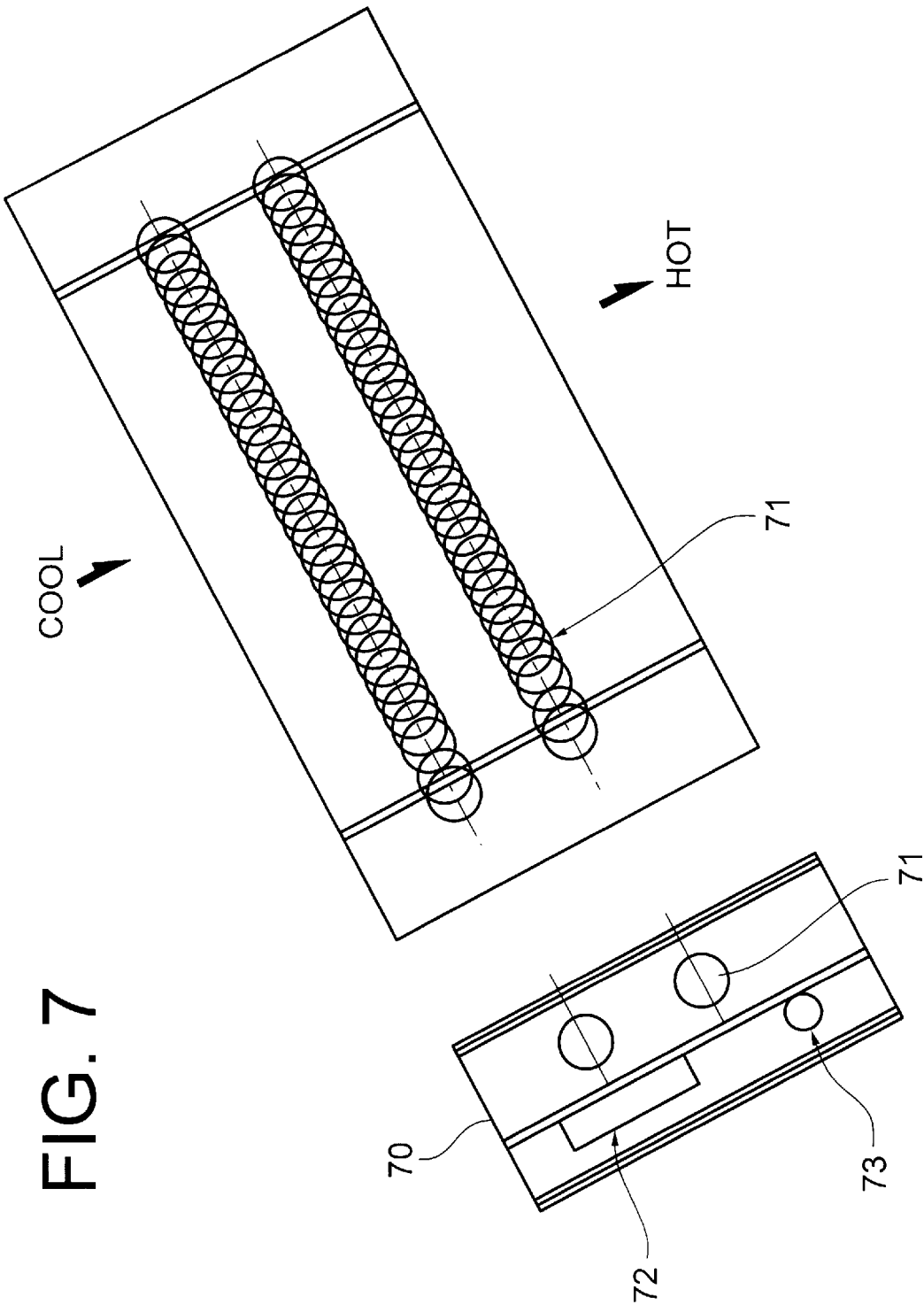

AUTOMATIC BAKING APPARATUS

FIELD OF THE INVENTION

The present invention relates to an automatic baking apparatus, and more particularly to an automatic convection heating baking apparatus for making bread, cake or the like.

BACKGROUND OF THE INVENTION

Home-made oven-fresh cakes and breads are something that young children are eager to look forward to and get excited when they receive them. Apart from the actual gastronomical appreciation of the baked products, the activities surrounding their making being along a lot of warmth and pleasure to family life. However, making such products often requires a lot of containers and utensils and involves a lot of preparation and is a lengthy process. The making of mouth-watering cakes or breads however often results in a messy kitchen plus a parent in a state of total fatigue.

Modern technology comes to help by offering automatic baking machines which produce baked products by simply having all the ingredients pot into a single machine, the rest of the process will then be taken care of the machine. With such machines, a cake will be table-ready some time after ingredients are introduced into the machine. However, cakes or breads made by such machines are often not as fluffy and are often not evenly baked. These shortcomings are largely due to baking machine designs. The modern trend for compact and slim domestic appliances means that baking machines having a baking compartment evenly surrounded by clusters of electric heaters would not be accepted by consumers. That is why automatic baking machines usually utilise convention heating. However, evenly distributed convection heating is very difficult to achieve and control and that is why machine-made cakes or breads are not very palatable.

SUMMARY OF THE INVENTION

It is an object of the present invention to provide an improved automatic baking machine which substantially alleviate the problems associated with current baking machines with a particular objective to provide a machine which is capable of making good, evenly baked cakes or breads.

According to the present invention, there is therefore provided an improved automatic convection baking machine comprising a main body having a main housing including an internal circumferential wall surrounding a baking chamber, a baking container adapted to be removably placed within said baking chamber, leaving a circumferential gap between said container and said internal wall, wherein said circumferential gap extends along a substantial part of said internal wall, said baking container further comprising stirring means for stirring contacts inside said baking container, and said main body further comprising driving means for driving said stirring means, air circulation means comprising air-driving means for causing air movement and air-channelling means, wherein said air-channelling means separates the space surrounding said air-driving means into regions of air -suction and -blowing, and heating means.

Preferably, the air-channelling means comprises a ventilation compartment placed between said baking container and said internal wall of said main housing, and said ventilation compartment comprising first and second lateral openings in communication with said circumferential gap and which together define the beginning and end of said circumferential gap.

Preferably, said air-driving means is an electric fan having propellers facing the center of said baking chamber and placed within said ventilation compartment, and wherein a fan aperture is provided on the surface of said ventilation compartment opposite to both said baking chamber for communication therewith.

Preferably, said first and second lateral openings are located on the left and right sides of said fan aperture.

Preferably the baking apparatus further comprises an air-regulating means, wherein said air-regulating means causes air emerging from said air-channelling means to accelerate along said circumferential gap.

Preferably the baking apparatus further comprises an air-regulating means, when in said air-regulating means causes air emerging from said air-channelling means to travel towards bottom of said baking chamber.

Preferably, said air-regulating means is a guide rail comprising an elongated strip which extends from said lateral opening along said internal wall and towards the bottom of said baking chamber, leaving a gap for air passage at the end of said guide tail.

Preferably the baking apparatus further comprises first and second timing means, wherein said first timing means is for heating control during mixing, and said second timing means is for heating control during baking.

According to the present invention, there is therefore also provided an automatic baking apparatus having means for mixing and means for baking, further comprising first and second timing means, wherein said first timing means is for heating control during mixing, and said second timing means is for heating control during baking.

Preferably said first and second timing means is adapted to operate independently.

BRIEF DESCRIPTION OF THE DRAWINGS

The present invention will now be illustrated and explained by way of examples and with reference to the accompanying drawings, in which:

FIG. 7 shows a suitable heater for using in the present embodiment.

DETAILED DESCRIPTION OF THE PREFERRED EMBODIMENT

Figure 1:
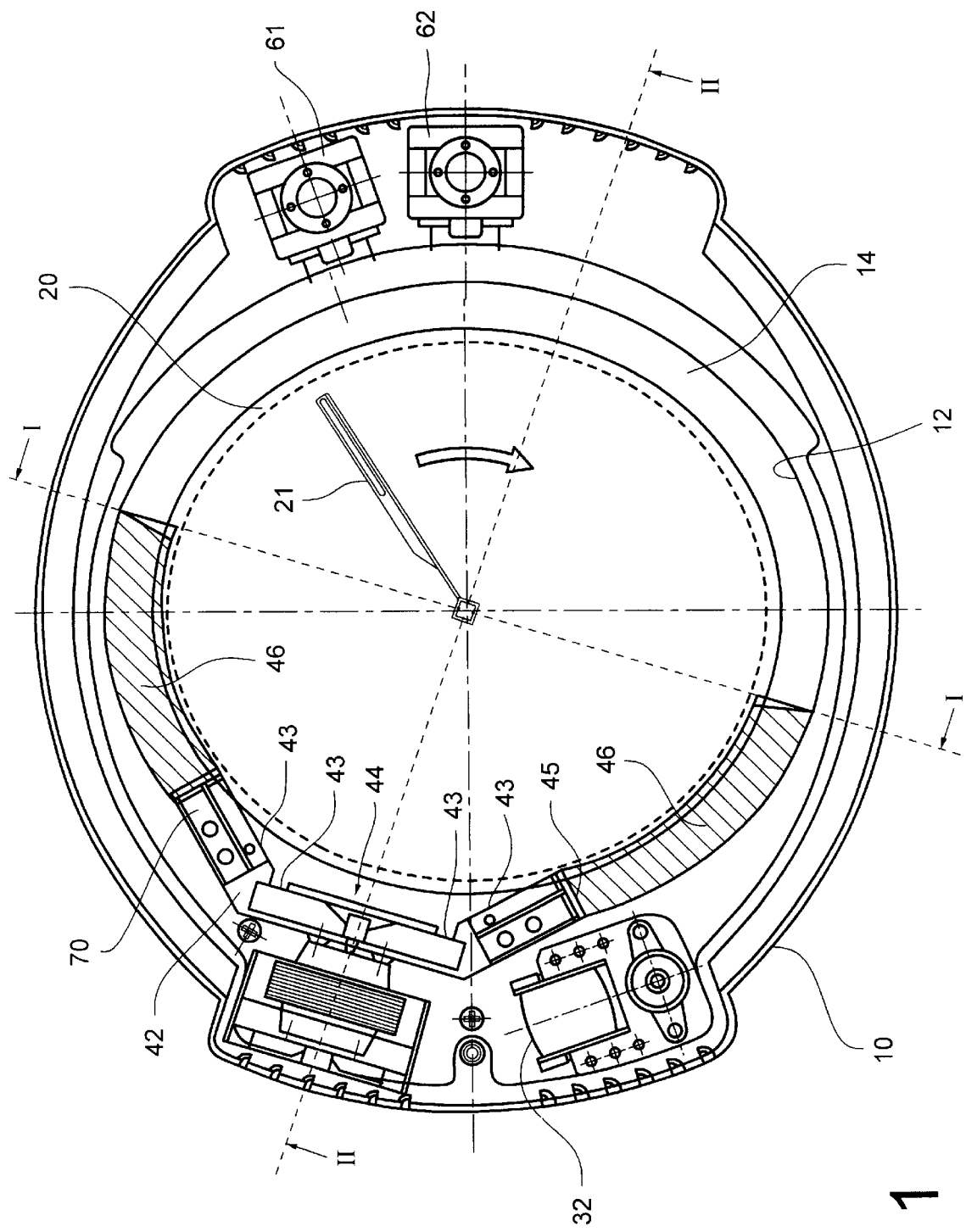
FIG. 1 shows a top view of the main body of the preferred embodiment with the baking container, which is provided with a stirring blade, placed in the baking chamber.
Figure 2:
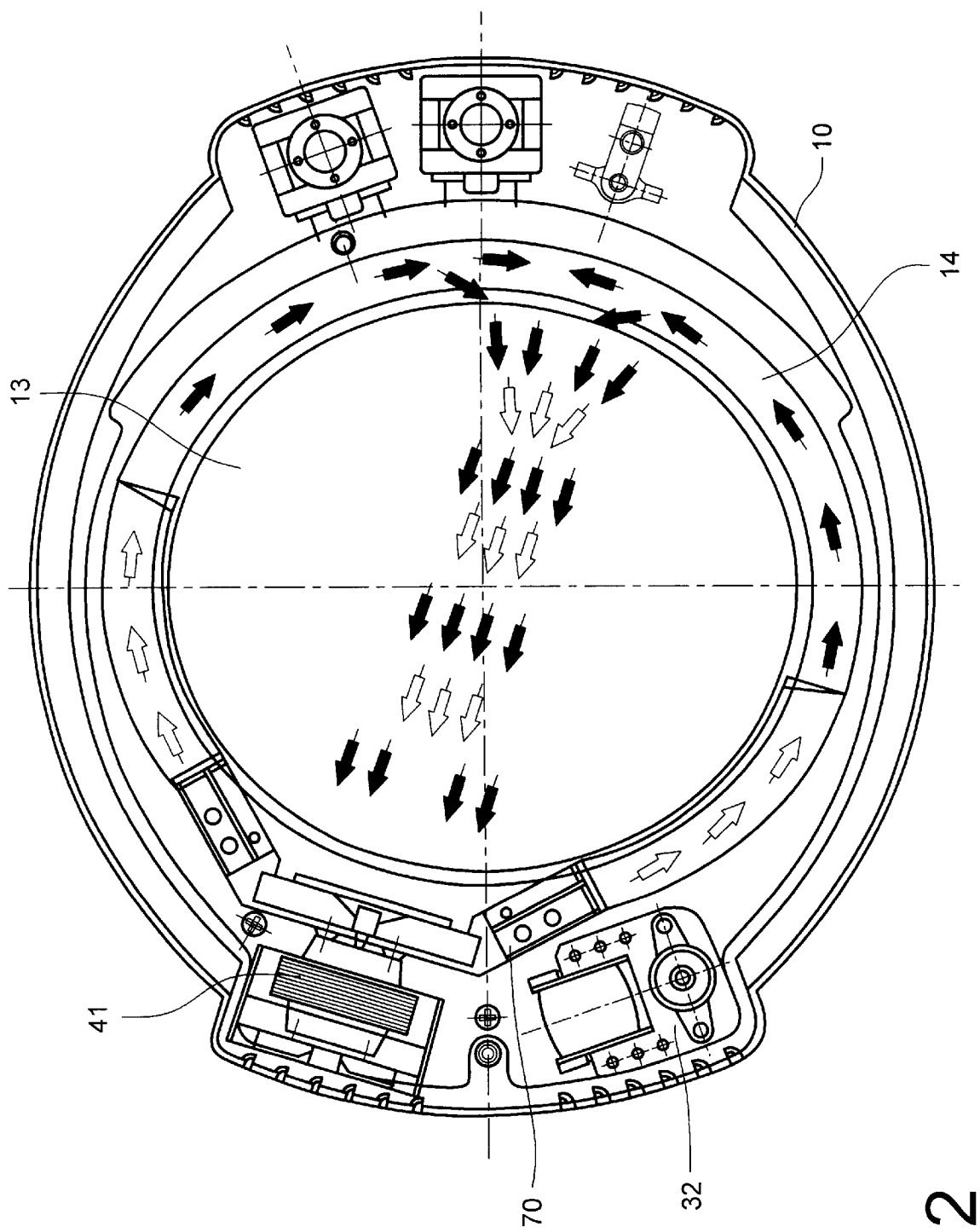
FIG. 2 is a top view showing the outline of the main body inserted with the baking container, arrows being used to indicate the direction of air circulation within the baking chamber when in normal operation.

Referring to the Figures there is shown a baking apparatus 1 comprising a main body 10 and a baking container 20 which can be wholly placed inside the main body. The baking container 20 is substantially circular so that cake or bread ingredients would not be easily caught and stuck at the corners. This container is preferably a metallic pan having non-stick coating for good heat transfer and ease of use.

Inside the container and for example at the bottom, there is provided a rotatable stirring blade 21 for mixing cake ingredients or for kneading bread dough. This rotatable blade 21 can be a single-blade design which extends from one side of the axis of rotation or a multi-blade design. Preferably the spatial coverage of this stirring blade in rotation is substantially equal to the whole base area of the baking container to assure effective and thorough mixing and kneading, an essential part of good baking.

The main body 10 comprises rigid main housing 11 inside which heating means, circulation means, timing means and blade driving means are provided. The main housing has an internal circumferential wall 12 within which a baking chamber 13 is defined. This internal wall 12 is shaped to follow the baking container outline so that when the baking container 20 is placed properly within the baking chamber 13, a circumferential gap 14 is maintained between them. This circumferential gap 14 is maintained for the purpose of providing a defined channel for thermal fluid, or put simply, hot air, circulation inside the baking chamber 13.

Figure 5:
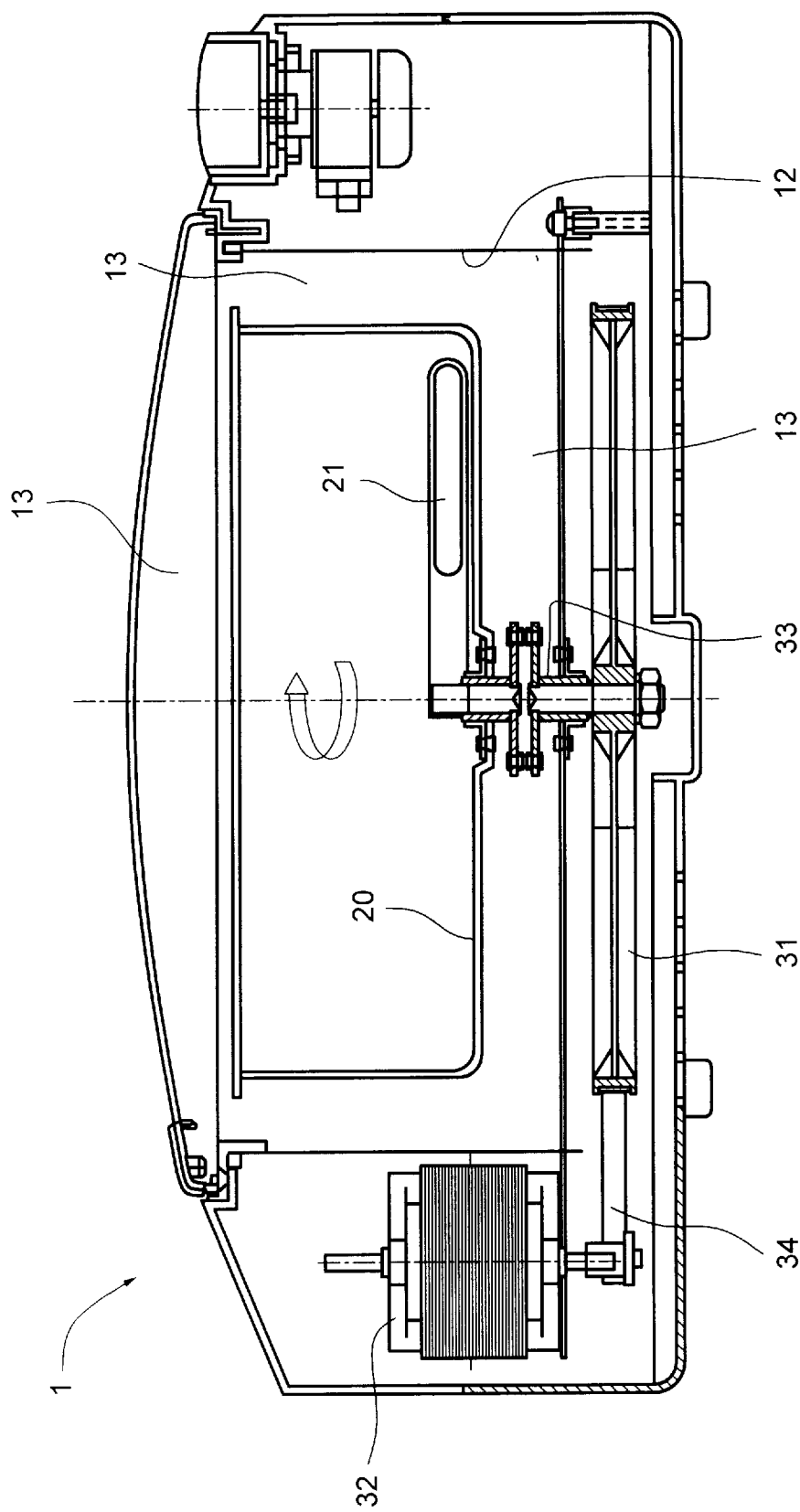
FIG. 5 is a schematic sectional view showing the blade-driving mechanism.

A blade driving mechanism is mounted on the main housing 11 and is shown in particular in FIG. 5. This driving mechanism comprises a horizontal rotatable wheel 31 which is placed directly under the baking container 20 and is driven by a small electric motor 32. This horizontal wheel 31 is provided with coupling means 33 for engaging or coupling with the stir-blade 21 inside the baking container. The wheel 31 is driven by a smaller wheel mounted on the motor shaft through belt 34 transmission in order to provide revolutionary speed reduction necessary for mixing or kneading, since, for example, an optimum speed for mixing cake ingredients is between 80–120 RPM.

Heating for the present embodiment is preferably provided by conventional electric heating sources such as resistive coils. Heat generated by the thermal source is generally distributed within the baking chamber 13 by a circulation means which is capable of causing thermal fluid circulation within the baking chamber and along pre-defined circulation paths. Preferably the circulation paths are closed within the baking chamber to minimise heat loss to the outside.

A preferred circulation means is realised by utilizing an electric fan 41 (FIG. 6) which is capable of causing forced fluid circulation by simultaneously providing suction and blowing, the essential ingredients for closed loop fluid circulation. The preferred use of a single device, e.g., a single electric fan, to perform these dual blowing and sucking function is an important feature of the present invention. If separate devices are used to produce suction and blowing, the apparatus would be bulkier and more costly.

The suction and blowing regions are effectively formed by partitioning the space surrounding the fan into regions of suction and blowing. Such partitioning is achieved by forming a ventilation compartment 42 on the internal wall of the housing which is provided with suction inlets and blowing outlets. Preferably, the inlets and outlets are arranged so that hot air entering and leaving the ventilation compartment is either in the radial or circumferential direction.

Figure 3:
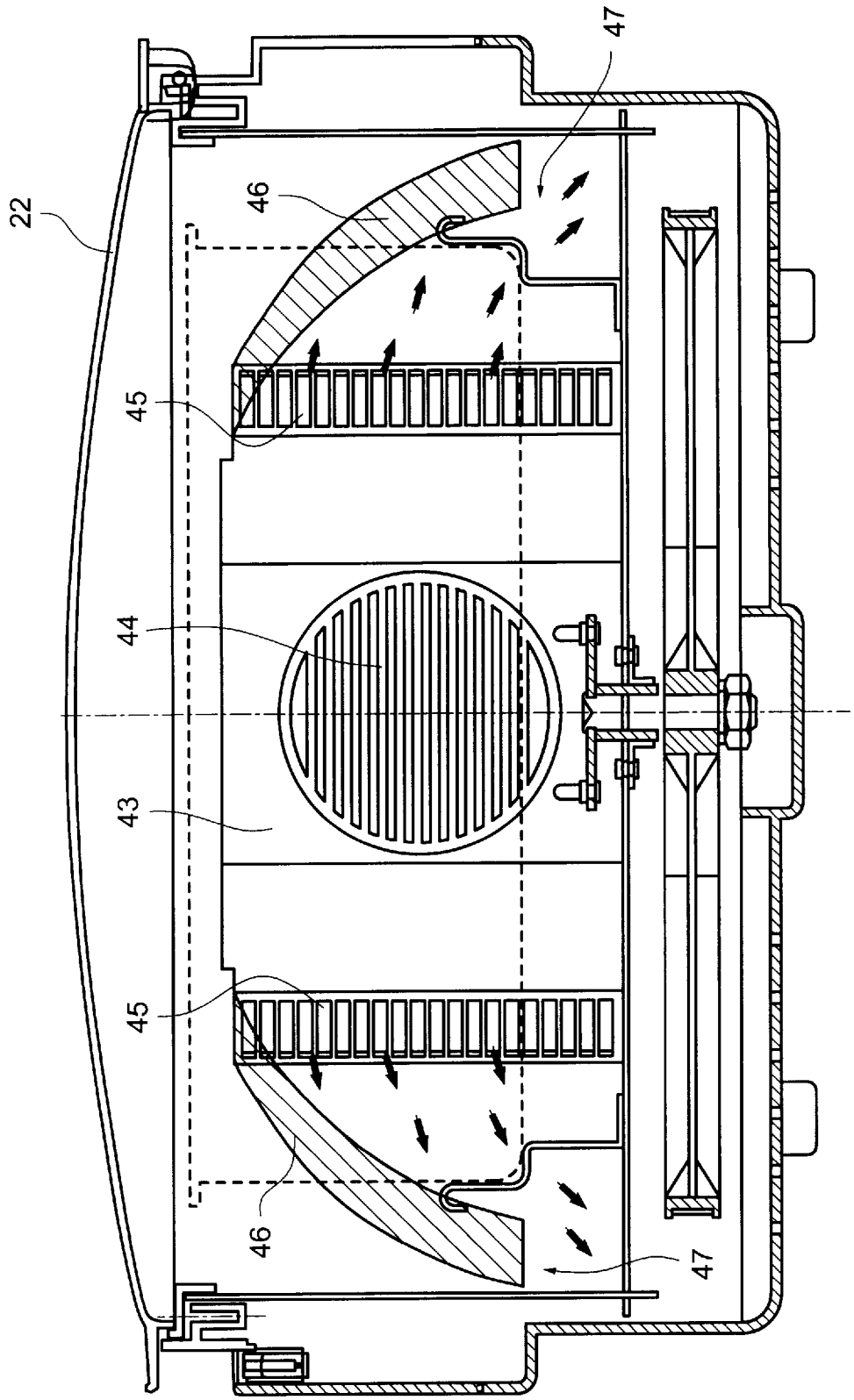
FIG. 3 is a sectional view of the main body taken along the line A—A.
Figure 4:
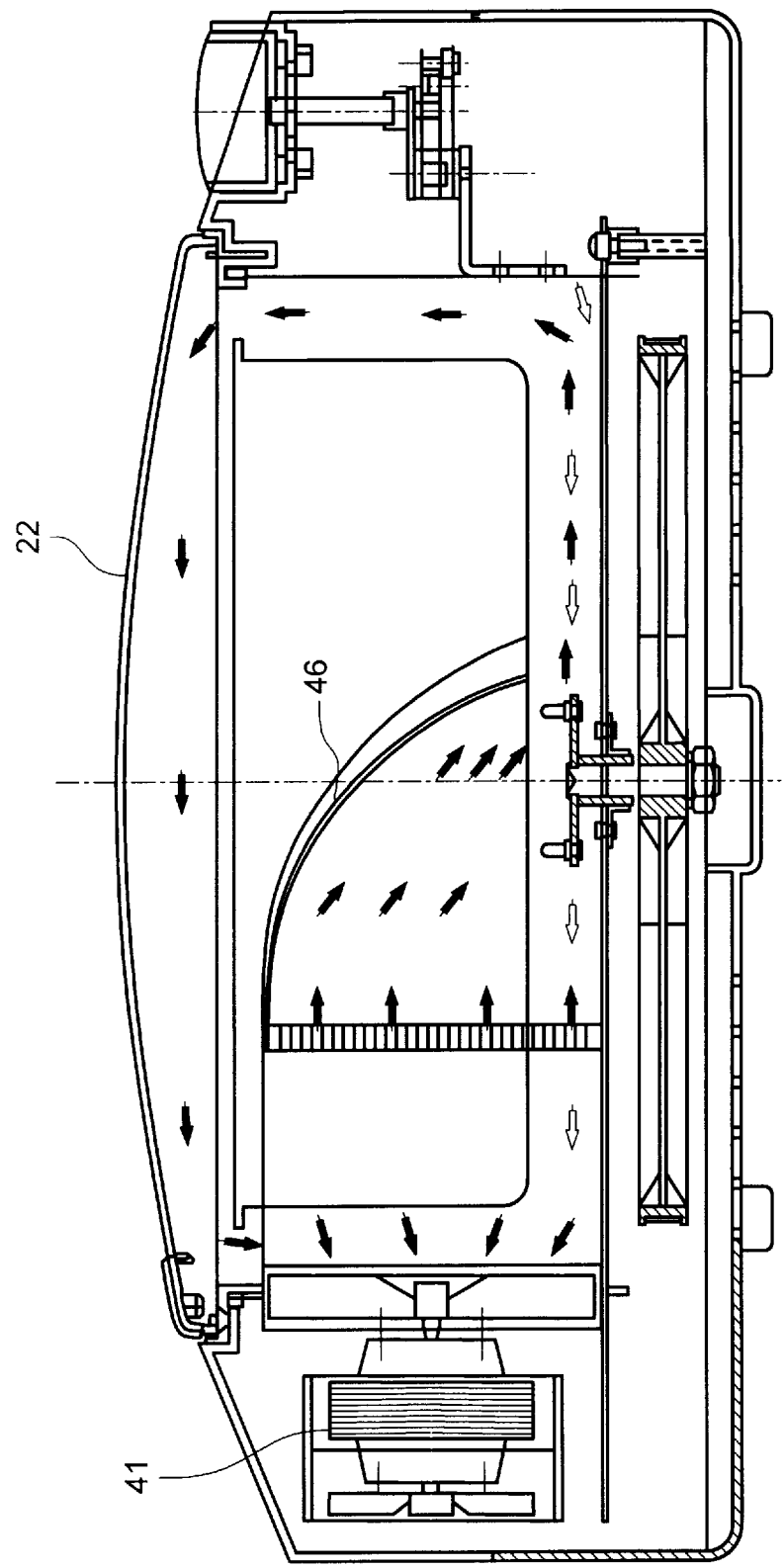
FIG. 4 is a sectional view of the main body taken along the line B—B.
Figure 6:
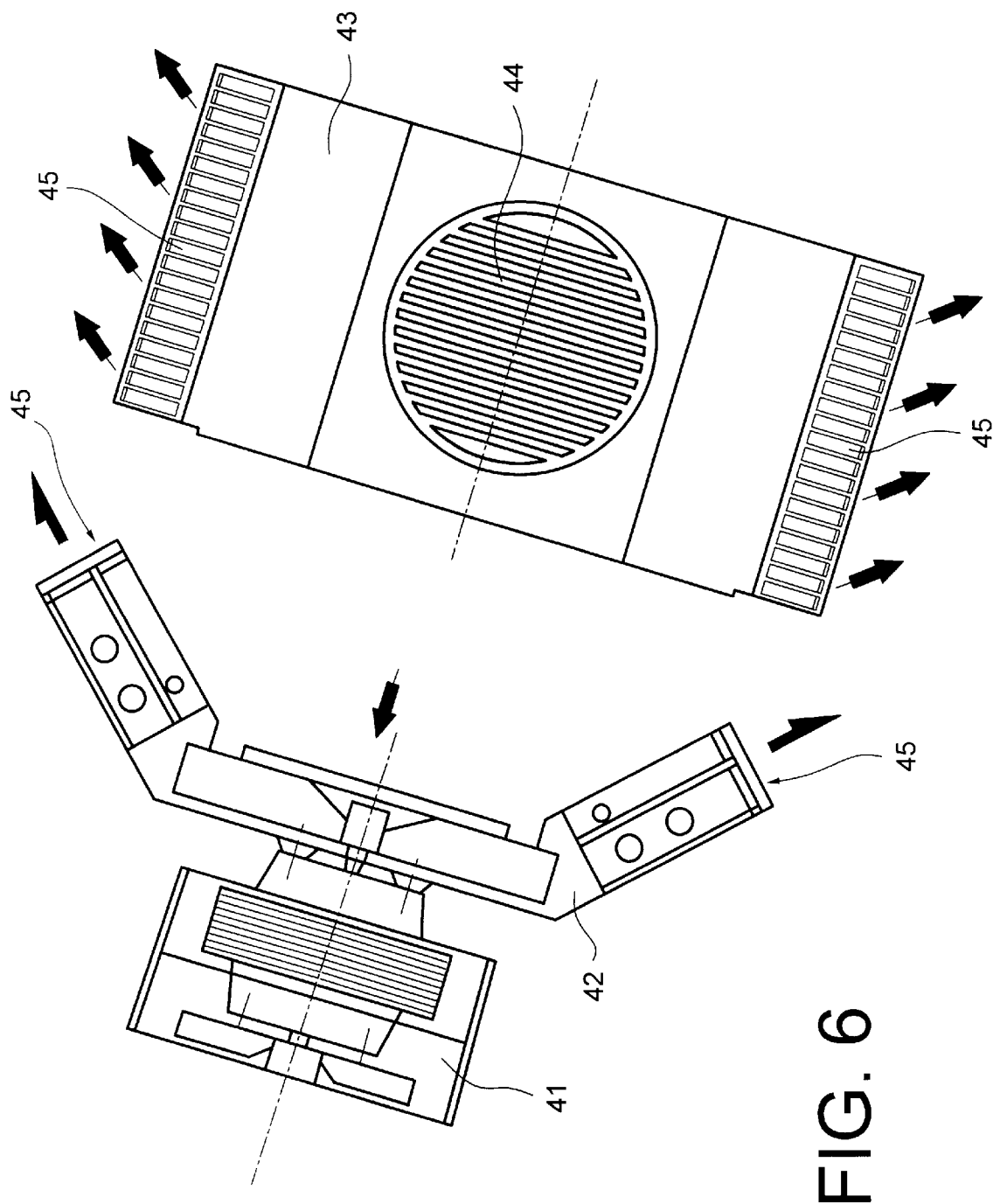
FIG. 6 shows the arrangements of the ventilation compartment.

Referring to FIGS. 1, 3 & 6, a ventilation compartment 42 is formed between the internal wall 12 of the main housing and a vertical partition wall 43. The vertical partition wall 43 is formed at a distance from the internal wall and shields the portion of the internal wall which is behind the partition wall from the baking chamber. An aperture 44 which is adapted to allow air passage normally from the plane of the fan propeller is formed on the partition wall 43. Preferably the size of this aperture is just large enough to accommodate the propeller blades for efficient ventilation.

The first and second lateral ends 45 of the ventilation compartment are left un-sealed, providing complementary passage paths for air entering or leaving the propeller aperture 44. When the motor 41 rotor rotates clockwisely, air current will be blown away from the propeller aperture in a radial manner towards the center of the baking chamber. The rapid pressure drop inside the ventilation compartment is then expeditiously compensated by air drawn from the surrounding regions, and particularly through the lateral end openings, thereby causing initial circumferential air movements along the internal wall of the baking chamber. Conversely, when the motor 41 rotates anti-clockwisely, air is sucked into the compartment through the propeller aperture 44 and leaves through the lateral end openings 45.

An air flow regulating means 46 is provided adjacent to the lateral opening. This regulator comprises a guide rail in the form of an elongated metal strip having a wide side facing upwards and connected to the ceiling of the lateral opening. This guide rail extends downwardly along the internal wall with one of its thin edges touching the internal wall until it nearly reaches the floor of the baking chamber. The gap between the strip and the floor thus forms a nozzle 47 through which mildly compressed and regulated air stream emerges towards the baking chamber.

This regulator is provided for several reasons. Firstly, when air emerges from the sides of a fan propeller, its initial movement will depend on the instantaneous movement of the propeller blade in contact. For example, when the fan is in clockwise rotation, the air immediately on the left side tends to move upwards while that on the right side tends to move downwards. The regulating rails serve to regulate air flow on its exit from the lateral openings by forcing it to conform to the guide path formed by the guide rail, thus producing on exit from the nozzles two air streams which are substantially identical. Secondly, if air streams are allowed to emerge from the lateral openings 45, they would be immediately under suction influence from the fan aperture 45, these regulating rails serve to transport the hot air further away from the fan aperture before the hot air is under its suction influence. Thirdly, the nozzle 47 helps accelerates the air speeds on exit from the nozzle, thereby allowing a larger portion of the hot air to reach the far end before they have to be returned to the ventilation apartment 42, thereby enabling reasonable heating even at the far end of the baking chamber.

Electric heating elements 70 are mounted inside the ventilation compartment near each lateral compartment opening so that the air surrounding them is adequately heated before leaving the openings. The electric heating element 70 as shown in FIG. 7 comprising resistive heater wires 71, a thermostat 72 and a thermo-fuse 73 would be a suitable heater fro the present application. The dual lateral opening design means that each lateral air stream exiting from a lateral opening is only required to cover half of the baking chamber space rather than the whole space which would otherwise be the case when a single opening design is utilised.

After the baking container 20 is properly placed inside the baking chamber and the lid 22 is covered on top, air is practically trapped inside the baking chamber. The remaining space not occupied by the baking container and its contents is therefore available for hot air circulation. This remaining space includes the space above and below the baking container and the circumferential gap 14 formed between the exterior wall of the container and the main housing. To allow hot air originating from the heater to reach the space above the baking container, transitional passages from the circumferential gap 50 to the space above the baking container are provided. This passage is provided in the present embodiment by using a dome-shaped lid so that air flowing in the circumferential gap can enter the baking space above. Ideally, hot air streams should be distributed about the whole space surrounding the baking container for even baking. This is done by providing improved predetermined circulation paths as explained in the following.

Turning now to hot air circulation within the baking chamber. When air streams leave the ventilation chamber through the lateral openings, they are forced to travel along the regulating rails before emerging from the nozzles at a higher speed. When an air stream emerges from the lateral opening 45, part of its continues to travel along the circumferential gap 14 and part yields to the suction influence of the fan 41 and returns to the suction aperture 44 from the space above and below the baking container.

Substantially symmetrical layout of the ventilation chamber and the nozzle acceleration means that the air streams will meet again at the far end of the baking chamber, i.e. the end opposite the fan aperture, as illustrated in FIG. 1. Because of the domed lid design, the air streams colliding at the far end of the fan aperture are now under suction influence from the rotating fan. The air streams will then recombine and flow towards the fan aperture. The circulation cycle will repeat again after the recombined air stream has entered the ventilation chamber, thereby producing continuous and even convection heating in defined paths.

A further advantage of the present invention is therefore that it enables suitable heating of the cake ingredients during the mixing stage, so that mixing and baking effectively take place at the same time. It has been discovered such simultaneous mixing and baking greatly enhances the fluffiness of a baked cake, a shortcoming which automatic or other types of cake makers are always complained of. To allow further baking flexibility in order to provide appropriate baking conditions, the present apparatus is provided with a timing means which comprises first and second timing devices. The first timing device 61 is for controlling heating during mixing while the second timing device 62 is for controlling baking.

These timing devices can be realised by using conventional timers or, more sophisticatedly, microprocessors. These timing devices are arranged so that they can be operated independently or in a correlative manner. In other words, a user can decide whether or not to provide heating during ingredient mixing to meet his personal preferences.

Provision of this dual timing device in combination with the present automatic baker significantly improves the quality of home-baked products so that presentable and enjoyable products can now be made at home without great fuss.

While the present invention has been explained and illustrated with reference to the above embodiment, it should be appreciated this improved cake machine can also be realised by adapting the principles described herein and by utilising other similar or equivalent methods of construction.

I claim:

1. An automatic baking apparatus, comprising a main body having a main housing including an internal circumferential wall surrounding a baking chamber, a baking container adapted to be removably placed within said baking chamber, leaving a circumferential gap between said container and said internal wall, wherein said circumferential gap extends along a substantial part of said internal wall, said baking container further comprising stirring means for stirring contents inside said baking container, and said main body further comprising driving means for driving said stirring means, air circulation means comprising air-driving means for causing air movement and air-channelling means comprising a ventilation compartment between said baking container and said internal wall of said main housing, said ventilation compartment comprising first and second lateral openings in communication with said circumferential gap which together define the beginning and end of said circumferential gap, and wherein said air-channelling means separates the space surrounding said air-driving means into regions of air-suction and -blowing, and heating means.

2. A baking apparatus according to claim 1, wherein said air-driving means is an electric fan having propellers facing the center of said baking chamber and placed within said ventilation compartment, and wherein a fan aperture is provided on the surface of said ventilation compartment opposite to both said baking chamber for communication therewith.

3. A baking apparatus according to claim 1, wherein said first and second lateral openings are located on the left and right sides of said fan aperture.

4. A baking apparatus according to claim 1, further comprising an air-regulating means, wherein said air-regulating means causes air emerging from said air-channelling means to accelerate along said circumferential gap.

5. A baking apparatus according to claim 1, further comprising an air-regulating means, wherein said air-regulating means causes air emerging from said air-channelling means to travel towards bottom of said baking chamber.

6. A baking apparatus according to claim 4, wherein said air-regulating means is a guide rail comprising an elongated strip which extends from said lateral opening along said internal wall and towards the bottom of said baking chamber, leaving a gap for air passage at the end of said guide rail.

7. A baking apparatus according to claim 5, wherein said air-regulating means is a guide rail comprising an elongated strip which extends from said lateral opening along said internal wall and towards the bottom of said baking chamber, leaving a gap for air passage at the end of said guide rail.

8. A baking apparatus, comprising a main body having a main housing including an internal circumferential wall surrounding a baking chamber, a baking container adapted to be removably placed within said baking chamber, leaving a circumferential gap between said container and said internal wall, wherein said circumferential gap extends along a substantial part of said internal wall, said baking container further comprising stirring means for stirring contents inside said baking container, and said main body further comprising driving means for driving said stirring means, air circulation means comprising air-driving means for causing air movement and air-channelling means, wherein said air-channelling means separates the space surrounding said air-driving means into regions of air-suction and -blowing, heating means, and first and second timing means for controlling said heating means, wherein said first timing means controls said heating means during mixing, and said second timing means controls said heating means during baking.

9. A baking apparatus as claim 8 wherein said first and second timing means is adapted to operate independently.

10. An automatic baking apparatus having a heater, means for mixing and means for baking, further comprising first and second timing means, wherein said first timing means controls said heater during mixing, and said second timing means controls said heater during baking.

* * * * *

UNITED STATES PATENT AND TRADEMARK OFFICE
CERTIFICATE OF CORRECTION

PATENT NO. : 5,878,655
DATED : March 9, 1999
INVENTOR(S) : Wing Kin CHAN

It is certified that error appears in the above-indentified patent and that said Letters Patent is hereby corrected as shown below:

On the Title Page, Item [73], please change "Packific" to --Pacific--.

Signed and Sealed this

Twenty-second Day of May, 2001

*Attest:*

NICHOLAS P. GODICI

*Attesting Officer*     *Acting Director of the United States Patent and Trademark Office*